United States Patent [19]

Rasmussen et al.

[11] 4,091,990

[45] May 30, 1978

[54] SELF-CONTAINED INSTRUMENT FOR MEASURING SUBTERRANEAN TUNNEL WALL DEFLECTION

[75] Inventors: Donald Edgar Rasmussen, Kennewick; Peter John Hof, Jr., Richland, both of Wash.

[73] Assignee: The United States of America as represented by the Secretary of the Interior, Washington, D.C.

[21] Appl. No.: 710,518

[22] Filed: Aug. 2, 1976

Related U.S. Application Data

[62] Division of Ser. No. 585,223, Jun. 9, 1975, Pat. No. 3,987,667.

[51] Int. Cl.² .............................................. G06K 1/05
[52] U.S. Cl. .................................... 234/115; 83/229; 234/130
[58] Field of Search ............... 234/114, 115, 116, 117, 234/119, 128, 130; 83/229

[56] References Cited

U.S. PATENT DOCUMENTS

| | | | |
|---|---|---|---|
| 266,593 | 10/1882 | Johnson | 83/227 |
| 3,051,376 | 8/1962 | Oldenburg et al. | 234/115 |
| 3,104,053 | 9/1963 | Rabinow | 234/115 |
| 3,289,509 | 12/1966 | Cahill | 83/227 X |
| 3,307,781 | 3/1967 | Jones, Jr. | 234/115 X |
| 3,536,256 | 10/1970 | Purps | 234/115 |

*Primary Examiner*—J. M. Meister
*Attorney, Agent, or Firm*—Gersten Sadowsky; Donald A. Gardiner

[57] ABSTRACT

The deflection of a subterranean tunnel is measured with a rod-like, self-contained instrument that is adapted to be inserted into a radially extending bore of the tunnel adjacent an end of the tunnel where the tunnel is being dug. One end of the instrument is anchored at the end of the bore remote from the tunnel wall, while the other end of the intrument is anchored adjacent the end of the wall in proximity to the tunnel wall. The two ends of the instrument are linearly displaceable relative to each other; the displacement is measured by a transducer means mounted on the instrument. Included in the instrument is a data storage means including a paper tape recorder periodically responsive to a parallel binary signal indicative of the measured displacement.

4 Claims, 12 Drawing Figures

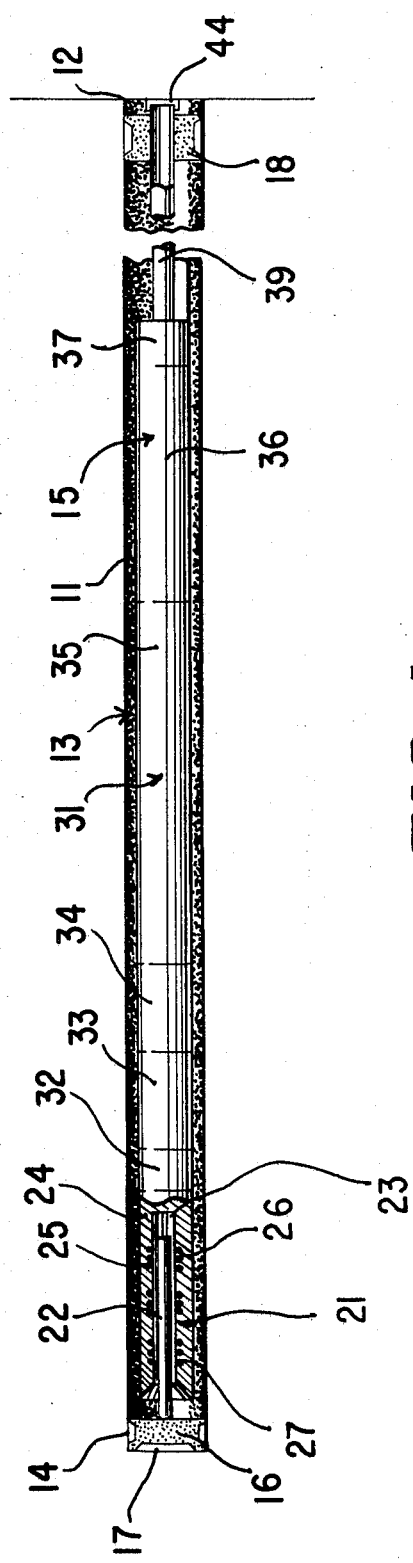
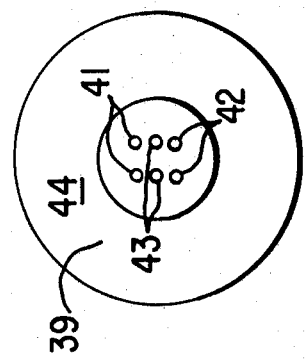

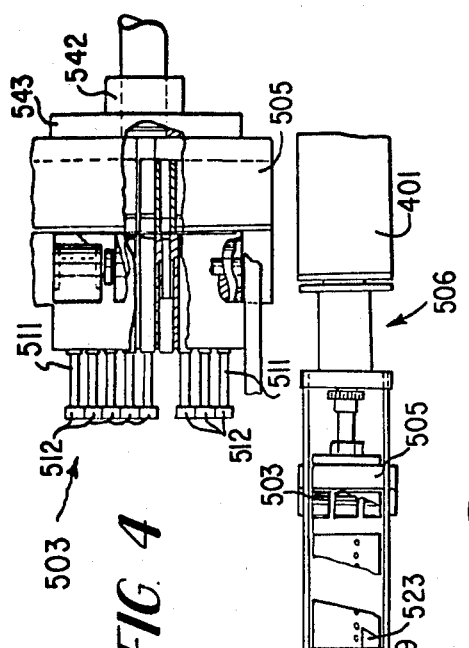
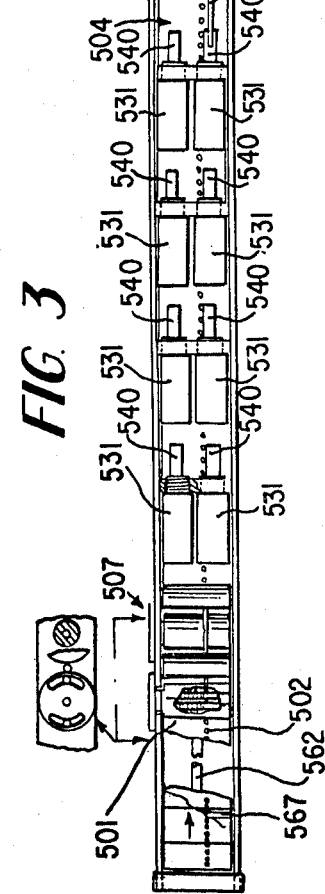
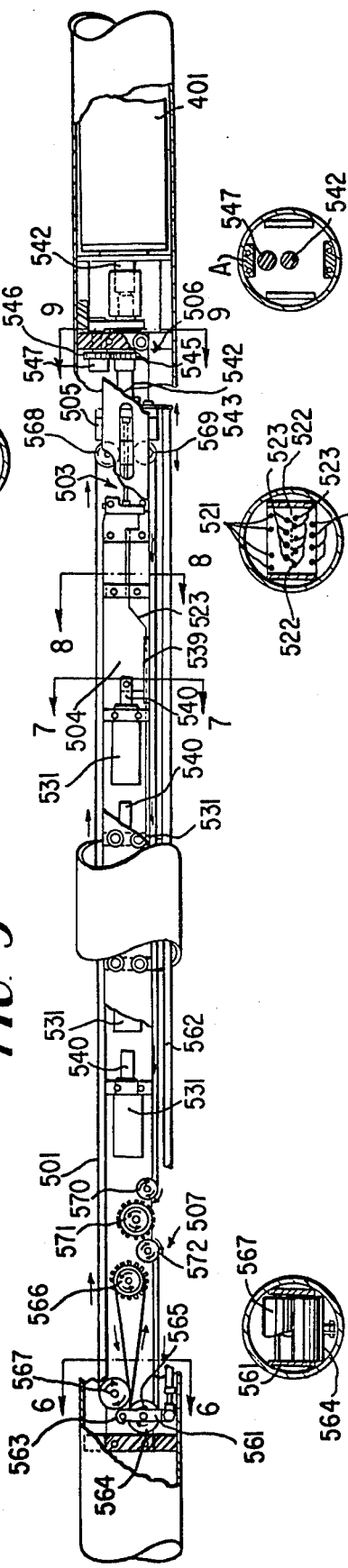

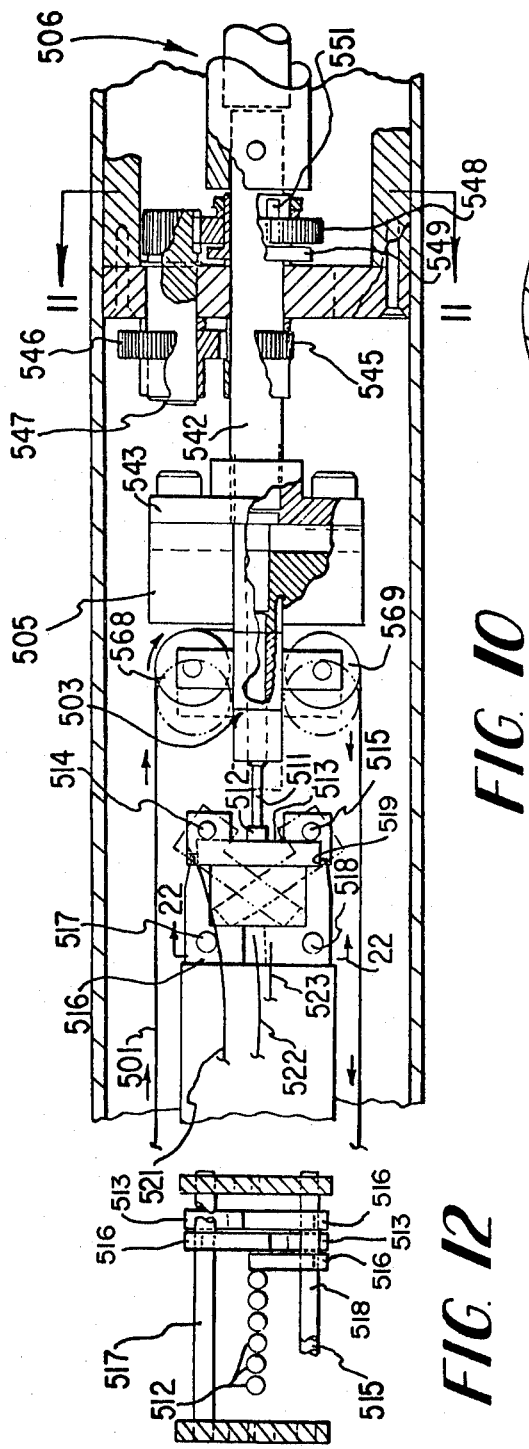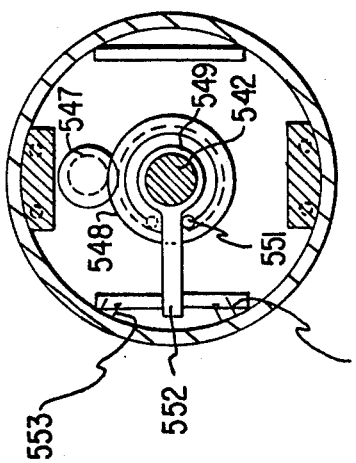
FIG. 10
FIG. 11
FIG. 12

SELF-CONTAINED INSTRUMENT FOR MEASURING SUBTERRANEAN TUNNEL WALL DEFLECTION

This is a division of application Ser. No. 585,223, filed June 9, 1975, now U.S. Pat. No. 3,987,667, granted Oct. 26, 1976.

FIELD OF INVENTION

The present invention relates generally to apparatus for measuring the amount of deflection of a subterranean tunnel, and more particularly to a completely self-contained rod-like instrument including a deflection measuring transducer, a data storage means, and a visual indicator to an operator.

BACKGROUND OF THE INVENTION

In the underground excavation industry, there are presently instruments to measure the deformation of tunnel walls in order rationally to establish underground support requirements as a tunnel is being dug, for a mine, for example. By measuring rock deflection at the tunnel wall, it is possible to predict tunnel support requirements as tunnel digging progresses. To be most beneficial, it is necessary to measure the rock deflection that occurs as the supporting tunnel rock is being removed. Such a requirement implies measuring the tunnel rock deflection at a location very close to the digging space of the tunnel.

It is known that rock deflection can be measured by forming a radial bore in the tunnel and inserting a rod-like measuring instrument into the bore. One end of the instrument is anchored to the end of the bore remote from the tunnel wall, while the other end of the instrument is anchored to the end of the bore adjacent the tunnel wall. The two ends of the instrument are movable relative to each other, whereby deflection of the rock is determined by measuring the relative displacement between the two ends of the instrument.

The prior art instruments have generally required connections to external signal storage devices, such as recorders, as well as to power supplies for transducers mounted on the instrument for measuring the relative movement of the two ends of the rod-like instrument. However, such external connections cannot usually be properly established and maintained, without greatly impeding the progress of the tunnel as it is being dug. Hence, the typical prior art instruments have not been compatible with measuring rock deflection as the tunnel is being dug, and thereby have not been effectively utilized in predicting tunnel support requirements as tunnel digging progresses.

It is, accordingly, an object of the present invention to provide a new and improved instrument for measuring the amount of deflection of a subterranean tunnel while the tunnel is being dug.

Yet another object of the invention is to provide a new and improved signal storage apparatus, in the form of a paper tape recorder, that can be contained on an instrument used to measure the amount of deflection of a subterranean tunnel, and which instrument is adapted to be inserted into a relatively small diameter bore extending radially from the tunnel wall.

BRIEF DESCRIPTION OF THE INVENTION

In accordance with the present invention, the deflection of a subterranean tunnel is measured while the tunnel is being dug with a rod-like instrument that is adapted to be inserted into a radially extending bore of the tunnel wall, wherein the instrument includes a transducer for measuring the amount of linear displacement between a pair of relatively displaceable ends of the rod-like instrument, a signal storage means, and a visual readout means located on a face of the instrument adjacent the tunnel wall. The complete instrument is self-contained, even though the diameter thereof is on the order of 1½ inches, enabling it to be inserted into a bore of the tunnel generally having a diameter on the order of two inches. The instrument is susceptible to operation over a relatively long time interval, on the order of several days, because it normally consumes a relatively low amount of power; a substantial amount of power is consumed only when the signal storage means is activated, at variable intervals that are usually spaced minutes apart. Prior to the instrument being initially activated there is a very low power consumption, even though the instrument can be turned on after being inserted in the bore, without touching any mechanical switches.

Operator commands are supplied to the instrument by illuminating a photodetector mounted on a face of the instrument adjacent the tunnel wall. Such illumination is conveniently provided by a flashlight or by a lantern carried on a helmet of an operator working in the tunnel. In response to the photodetector being illuminated for different periods, different modes of operation are provided. In particular, the device is initially activated by illuminating the photodetector for a period on the order of thirty seconds. Thereafter, by illuminating the photodetectors for fifteen additional seconds, the instrument is activated so that the storage means is periodically activated and the transducer can be calibrated. During calibration the two relatively displaceable ends are linearly displaced relative to each other until a visual indication of a zero position is attained. The visual indication is provided by a pair of different colored light sources that are preferably light emitting diodes. During calibration, the two different colored light sources are steadily activated, depending upon the position of the transducer relative to a reference position; when the transducer is on one side of the reference position, the light source for one color (e.g., green) is activated, while the light source of the other color (e.g., red) is activated when the transducer is on the other side of the reference position. In response to the transducer being adjusted or calibrated so that it is at the reference position, both light sources appear to be activated substantially simultaneously.

After calibration has been completed, and it is desirable to provide a visual indication of the position of the transducer, the photodetector is illuminated for a relatively short interval. In response to the short interval illumination of the photodetector, a serial binary signal indicative of the transducer position is supplied to the two different colored light sources. In response to a binary signal of one level, one of the light sources is flashed on; in response to the second binary level, the other light source is flashed on. Thereby, the operator is able to manually record the binary magnitude of the transducer position.

Once the system has been installed, readings of the transducer position are automatically and periodically supplied to a signal storage device. In a preferred embodiment of the invention, the signal storage device is a specially designed punch paper tape recorder that can fit into the approximately 1½ inch inside diameter tube. The recorder is responsive to a parallel binary signal indicative of the transducer position. The recorder is of a relatively low speed type, since it is periodically activated typically only once every fifteen minutes to punch one line of information. The recorder includes a number of pins responsive to a parallel binary signal indicative of the transducer position. In response to the magnitude of the binary signal, certain of the pins are selectively locked into position, while other pins are easily moved. After the selected pins have been locked into position adjacent one side of the tape, a die plate is translated into engagement with the other side of the tape. The die plate and tape are advanced at the same rate so that they appear stationary relative to each other. Moving the die plate to cause the paper to be punched after the pins have been selectively locked, allows a drive motor for the die plate to be placed at one end of the recorder, while pin selecting solenoids are placed at the other end of the recorder. This arrangement also enables the recorder to have a size such that it can be fit into the small diameter tube.

It is, accordingly, still another object of the invention to provide a new and improved low speed punch paper tape recorder.

A further object of the invention is to provide a punch paper tape recorder particularly adapted to be inserted into a tube forming a housing for a self-contained instrument for measuring the deflection of a subterranean tunnel.

An additional object of the invention is to provide a new and improved punch paper tape recorder particularly adapted to be located in a tube having an inner diameter on the order of 1½ inches.

A further object of the invention is to provide an instrument for measuring the amount of deflection of a subterranean tunnel wherein commands are supplied to the instrument by an operator without the operator touching the instrument.

The above and still further objects, features and advantages of the present invention will become apparent upon consideration of the following detailed decription of one specific embodiment thereof, especially when taken in conjunction with the accompanying drawing.

BRIEF DESCRIPTION OF THE DRAWING

FIG. 1 is a side view of the general arrangement of a preferred embodiment of the present invention;

FIG. 2 is an end view of the face of the instrument adapted to be located in proximity to the tunnel wall;

FIG. 3 is a plan view of the paper tape recorder;

FIG. 4 is an enlarged view of a portion of the paper tape recorder illustrated in FIG. 3;

FIG. 5 is a side view of the paper tape recorder;

FIG. 6 is a side view, taken through the lines 6—6 of FIG. 5, specifically illustrating idler roller mechanism for driving the paper tape;

FIG. 7 is a cross-sectional view, taken through the lines 7—7 of FIG. 5, specifically illustrating the position of a pair of solenoids;

FIG. 8 is a side-sectional view, taken through the lines 8—8 of FIG. 5, specifically illustrating the positions of pull wires and springs for controlling punches of the paper tape recorder;

FIG. 9 is a cross-sectional view, taken through the lines 9—9 of FIG. 5, specifically illustrating the position of drive shafts for a die plate of the punch paper tape recorder;

FIG. 10 is an enlarged view of the drive and tape punching area of the paper tape recorder;

FIG. 11 is a sectional view, taken through the lines 11—11 of FIG. 10, specifically illustrating a motor drive shaft and a tongue for controlling the extent of rotation of the motor; and FIG. 12 is a sectional view, taken through the lines 12—12 of FIG. 10, specifically illustrating punch pins of the recorder and a portion of the control mechanism for the pins.

DETAILED DESCRIPTION OF THE DRAWING

Reference is now made to FIG. 1 of the drawing wherein there is illustrated an elongated bore 11, typically having a length of between 7 and 25 feet, in wall 12 of a subterranean tunnel, such as subsists in a mine. Bore 11 extends radially of the tunnel, i.e., at right angles to the longitudinal axis of the tunnel, and typically has a diameter on the order of 2 inches. Fitted within bore 11 is a selfcontained instrument 13 for measuring the deflection of wall 12 relative to rock at the face 17 of bore 11 remote from wall 12. Instrument 13 has a rod-like shape and is formed of two parts 14 and 15 which are longitudinally translatable relative to each other. Part 14 is secured to remote face 17 by a conventional anchor 16 that bears longitudinally and radially against face 17 and the wall of bore 11. Part 15 is secured in bore 11 adjacent tunnel wall 12 by anchor 18 that bears radially against the wall of bore 11 at a position close to the intersection of the bore and tunnel wall.

To measure the deflection of wall 12 relative to face 17, linear variable differential transformer (LVDT) 21 is provided. Core 22 is normally attached to anchor 16 using extension rods (not shown) of length suitable to place the tunnel end of part 15 near tunnel end anchor 18. Transformer 21 includes a fixed, cylindrical core 22 of high magnetic permeability that is fixedly mounted on a face of anchor 16 so that it extends longitudinally in bore 11 toward tunnel wall 12. Core 22 extends longitudinally of an elongated bore 23 in non-magnetic tube 24 at the end of part 15 remote from wall 12. Mounted on the inner wall of the tube 24 are coils 25, 26 and 27 that respectively form excitation and differential output windings of LVDT 21. In response to the relative position of core 22 and tube 24 due to deflection of wall 12 relative to end face 17, there is a change in magnetic flux between excitation coil 25 and differential output coils 26 and 27. The flux change is reflected in a variation of the voltage between windings 26 and 27 in proportion to the relative longitudinal position of the two anchored ends of instrument 13.

Tube 24 forms the end of a cylindrical instrument housing 31 to which it is fixedly connected; the tube and housing have the same outer diameter, approximately 1⅜ inches. Typically, housing 31 has a total length, from the end of tube 24 to its other end, which is proximate the tunnel end of bore 11, of five and one-half feet. Within cylindrical housing 31 are cylindrical compartments 32–37, spaced from tube 24 in the order named. In compartment 32 there are located electronic circuits that excite winding 25 and are responsive to the output signal of differential windings 26 and 27. In compartments 34 and 36 are located batteries; compartment 35, between the two battery compartments, contains a signal storage means, in the form of a punch paper tape recorder responsive to parallel binary signals. In compartment 33, circuitry is provided for controlling electronic circuitry included in compartment 32, as well as for controlling activation of the recorder included in compartment 35.

End compartment 37 is responsive to signals derived from the electronic equipment included in compartment 33, as well as to externally induced operator command signals. The electronic circuitry included in compartment 37 includes a visual indicator which is optically coupled to the face of instrument 13 proximate tunnel wall 12 via extension tube 39. The externally induced command signals are coupled to a photodetector network included in compartment 37 in response to an optical signal supplied by an operator being coupled from the face of the instrument proximate tunnel wall 12 to the photodetector via tube 39.

Tube 39 fixedly connects together the face of the instrument proximate tunnel wall 12 and the end wall of housing 31 where compartment 37 is located. Annular anchor 18 includes a cylindrical inner wall which is secured to an outer cylindrical wall of extension tube 39 just behind the intersection of bore 11 and tunnel wall 12. The optical energy for energizing the photodetectors may be derived from a flashlight held by an operator in the tunnel or in response to light from a lantern mounted on a helmet of the operator. Two green light emitting diodes (LED's) 41 and two red (LED's) 42, as well as two photodetectors 43, are provided for redundancy, in the event of a failure to any one of these elements. It is to be understood, however, that only a single LED 41, a single LED 42 and a single photodetector 43 need be provided, if the reliability of these elements is considered to be sufficiently high. Light is transmitted to photodetectors 43 and from light emitting diodes 41 and 42 via a lucite cap 44 which forms a face of instrument 13 that can be viewed from the tunnel.

After parts 14 and 15 of instrument 13 have been anchored in situ, and prior to the initiation of normal operation of the instrument, the instrument is calibrated by translating core 22 relative to windings 25-27 until windings 26 and 27 derive an output which causes a predetermined reading to be derived from the LVDT 21. To adjust the relative positions of parts 14 and 15, the longitudinal position of externally threaded tube 41' relative to tunnel wall 12 is adjusted by the apparatus illustrated in FIG. 3. Hollow tube 41 engages instrument zeroing nut 42' that is rotatable but not translatable within tubular extension 43 of anchor 18. (Although extension 43 is fixed to anchor 18, the extension can be unscrewed from the anchor thereby allowing all of part 15 to be removed for repair or battery replacement without disturbing anchor 18). Extension 43 is fixedly mounted on cylinder 45 that includes a pair of longitudinally spaced external ribs 44' between which adhesive is extruded utilizing relatively conventional anchoring procedures. Threaded shaft 41' extends through nut 42', extension 43' and cylinder 45, whereby nut 45 can be rotated on shaft 41 and within anchor extension 43 causing longitudinal displacement of tube 41' and windings 25-27 of transformer 21 after anchor 18 has been fixed in situ. Fixedly mounted on the end of shaft 41', at the end of the instrument closest to tunnel wall 12, is hollow cylindrical housing extension 39. The other end of tube 41' is connected to part 15 using coupling 46. Lucite cap 44 is mounted at the end of the instrument adjacent photodetectors 43 and LED's 41 and 42 and isolates the interior of instrument 13 from the underground environment.

Prior to installation, the instrument is in a standby, extremely low power consuming state such that the amount of current drawn from the batteries is approximately the same as leakage current while the batteries are on the shelf. When the instrument is initially installed in bore 11, photodetectors 43 are illuminated for approximately thirty seconds, causing the instrument to go from the standby state to a quiescent state, whereby it consumes a greater amount of power and is adapted to be responsive to additional signals coupled by the operator to photodetector 43. Generally, after the instrument has been activated to the quiescent state the first command supplied by the operator is a command to switch to a calibrate mode or state. This is accomplished by the operator illuminating photodetectors 43 for a period between one and three seconds; actually, the circuitry will switch into the calibrate mode in response to illumination of photodetectors 43 for a period between one and twenty-five seconds, but the operator is advised that he is to illuminate the photodetectors for between one and three seconds.

With the instrument in the calibrate mode, green LED's 41 and red LED's 42 provide an indication of the relative position of core 22 and windings 25-27, about a reference point. In response to windings 25-27 being inserted into bore 11 beyond the reference point, green LED's 41 are activated, while red LED's 42 are activated in response to windings 25-27 not being beyond the reference position. The position of threaded shaft 41 relative to nut 42 is adjusted until both red and green LED's 41' and 42' are substantially simultaneously activated, at which time LVDT 21 is at the reference position. After a predetermined time interval, on the order of one and one-half minutes, the instrument is automatically activated out of the calibrate mode. If the instrument has not been calibrated during the one and one-half minute interval, it is again activated into the calibrate mode by illuminating photodetector 43 for a second period of between one and three seconds.

After the instrument has been calibrated, it returns to the quiescent state. Thereafter, in response to an additional 25 second illumination of photodetector 43, the instrument is periodically automatically activated so that the relative position of parts 14 and 15 is coupled from transformer 21 as a parallel, binary signal to the punch tape recorder included in compartment 31. The frequency of the recorder in compartment 31 being activated is pre-selectable, and is typically on the order of once every 1,000, 2,000 or 4,000 seconds. Immediately prior to the recorder in compartment 31 being activated, the system is activated into a full power state, where it usually remains until the signal value derived from transducer 21 has been punched into the paper tape recorder. Thereafter, the system usually returns to the quiescent state, so that the batteries in compartments 34 and 36 are not exhausted until many recorder activation sequences have occurred.

The operator is also able to obtain a visual indication, in binary form, of the relative position of instrument parts 14 and 15. In particular, the operator is provided with a binary signal indicative of the exact position of core 22 relative to windings 25-27 by activating photodetector 43 for a relatively short interval, less than seven-tenths of a second. In response to such an instantaneous illumination of photodetector 43, the instrument usually goes into a full power state and a serial binary signal is derived in response to the output of LVDT 21 and is coupled to green and red LED's 41 and 42. A binary one level causes green LED's 41 to be activated, while a binary zero level causes red LED's 42 to be activated. Thereby, the operator is supplied with a series of flashing red and green lights, with the most significant bit being supplied to one of LED's 41 or 42 first, and the least significant bit being supplied to one of the LED's last. After the least significant bit has activated LED's 41 or 42, the instrument usually returns to the quiescent state.

Certain safeties are provided in the event that the recorder included in compartment 31 is activated while photodetectors 43 are momentarily illuminated; normally momentary illumination of photodetectors 43 causes a visual indication of the position of core 22 relative to windings 25-27 to be derived. However, if the recorder in compartment 31 is activated prior to momentary illumination of photodetector 43, the recorder remains activated and no signal is supplied to LED's 41 and 42. The operator must again illuminate photodetectors 43 to enable LED's 41 and 42 to be activated upon completion of a record cycle. In response to photodetectors 43 being momentarily illuminated immediately prior to activation of the recorder in compartment 31, whereby the recorder would normally be activated while the LED's are activated, the instrument remains in a powered condition after activation of LED's 41 and 42. Thereby the recorder is automatically activated immediately after the least significant bit has been illuminated by one of LED's 41 or 42.

A functional block diagram of the electronics network included in compartments 32, 33 and 37 is illustrated in FIG. 4.

Disclosure to be found in the above-identified U.S. Pat. No. 3,987,667, issued in the parent case, includes the pertinent details of electronic networks in the compatments 32, 33, and 37, which control the periodic storing of data by the recorder in compartment 31 and the selective coupling of binary data bits to LED's 41 and 42, as well as the coupling of power from the batteries in compartments 34 and 36 to these electronic networks and the recorder.

Reference is now made to FIGS. 3 to 12 wherein there is illustrated, in varying degrees of particularity, the punch paper tape recorder included in compartment 31. The punch paper tape recorder is specially designed so that it can fit into a tube having a circular cross-section and a diameter on the order of one and five-eighths inches. The punch paper tape recorder utilizes, as a binary signal storage means, an endless paper tape 501 of a type that is usually employed for recording eight bit binary signals and is provided with pre-punched sprocket or guide holes 502. The punch paper tape recorder basically includes: a punching station 503 positioned on one side of tape 501, as illustrated in detail in FIG. 4; an actuator station 504 for the punches at punch station 503; a die plate 505 selectively urged against a second side of the paper tape; a drive mechanism 506 for die plate 505; and a drive mechanism 507 for the punch paper tape. Tape 501 is threaded so that it passes through a relatively narrow gap between punch station 503 and a face of die plate 505.

Punch station 503 includes eight punches 511 horizontally disposed across the width of tape 501, except where sprocket holes 502 are located. Punches 511 are normally free to translate in a horizontal plane, but are selectively locked in situ. An end of each locked punch 511 proximate the inner face of tape 501 engages and punches the tape in response to activation of solenoid coils 379, one of which is provided for controlling the different punches. Eight sets of substantially identical mechanisms are provided for locking the eight punches 511, so that a description of one locking mechanism basically suffices for all. Selective locking of the position of punches 511 is attained by providing anchor levers 513, each having a vertically extending wall that normally bears against a vertically extending face of shoulder 512 at the end of punch 511 remote from the end that selectively engages tape 501. Alternate ones of anchor levers 513 are mounted to be pivoted about rods 514 and 515, which are respectively positioned above and below a horizontal plane containing the longitudinal axis of punches 511. The corner of anchor lever 513 remote from the face of the anchor lever that bears against shoulder 512, and remote from the pivot axis defined by rods 514 and 515, is normally captured in a square notch 519 at the end of latch lever 516. Alternate ones of latch levers 516 are rotatable about rods 517 and 518, respectively horizontally aligned with rods 514 and 515.

The rotation of anchor levers 513 and latch levers 516 about shafts 514, 515, 517 and 518 is controlled by anchor lever tension springs 521, latch lever tension springs 522 and pull wires 523. Each of anchor lever springs 521 is fixedly secured to a corner of its corresponding anchor lever 513, urging the anchor lever toward the right, as illustrated in FIG. 20. Each of latch lever springs 522 is connected to an edge of its respective latch lever 516. Springs 522 extend generally horizontally and lie approximately along the center line of the recorder to urge its latch lever toward the right. Each of pull wires 523 is mounted on its corresponding latch lever 516 between the edges of the latch levers adjacent the center line and the pivot points defined by rods 517 and 518.

Each of pull wires 523 is selectively activated in response to energization of the solenoid 531 connected to it. Eight solenoids 531, each including a soleoid coil 379, and one for each of the eight least significant binary output bits of the converter, are mounted in side-by-side pairs, so that four pairs thereof are disposed along the length of the one and five-eighths inch dimater tube. An activated solenoid causes its pull wire 523 to be translated to the left, through bracket 539, that is connected between a plunger 540 of the solenoid and the end of wire 523 remote from the wire end connected to latch lever 516.

In reponse to energization of a selected solenoid 531 due to activation of its solenoid coil, the plunger 540 of the selected solenoid is translated to the left, drawing the bracket 539, connected to the energized solenoid coil, and the associated pull wire 523 in the same direction. The pull wires 523 which are drawn to the left cause the latch levers 516 mounted for rotation about rod 517 to be rotated in the clockwise direction, while the latch levers mounted for rotation about rod 518 are rotated in a counterclockwise direction. The clockwise and counterclockwise rotations of the latch levers 516 respectively mounted on rods 517 and 518 cause the notches in the latch levers to securely engage the corners of the associated anchor levers 513. Thereby, the anchor levers 513 having corners engaged by the notches in latch levers 516 are restrained from movement; the restraint is maintained during the entire time while the associated solenoids 531 are activated.

The latch levers 516 connected to pull wires that are not pulled to the left (i.e., the pull wires which are ultimately connected to solenoids that are not activated) are free to pivot in the counterclockwise and clockwise directions about pivot rods 517 and 518, respectively. Thereby, the anchor levers 513 associated with the latch levers that are not restrained are also free to pivot; those anchor levers mounted on rod 514 rotate in the clockwise direction in response to a horizontal force being imparted thereto by punches 511 being translated to the left, while the anchor levers mounted to rotate on rods 515 pivot in the counterclockwise direction in response to their associated punches 511 being translated to the left.

In summary, the selective latching of anchor levers 513 and latch levers 516 provides corresponding latching for punches 511. The punches 511 which are coupled to unlatched anchor levers are free to translate to the left in response to a force being exerted against the punch faces adjacent tape 401 by translation of die plate 505 to the left. The latched punches are held in situ while the die plate is translated to the left to urge tape 501 against the latched punches, whereby the leftward movement of the die plate 505 causes punching.

Die plate 505 is translated to the left by drive mechanism 506 after pins 511 have been selectively latched in place. Drive mechanism 506 includes reversible D.C. motor 401, that is positioned at the extreme right end of the recorder, as viewed in FIG. 15, and is energized by the circuitry provided therefor as disclosed in the previously identified parent case. Motor 401 includes an output shaft 542 that is rotated in the clockwise direction, looking at the motor from the shaft end, while solenoids 531 are energized. Shaft 542 is threaded into push plate 543 that is connected to die plate 505, causing the die plate to translate toward the left. Translation of die plate 505 causes translation of punch station 503 and tape 501 to the left, a result achieved by passing the tape over horizontally translatable idler rolls 568 and 569 and mounting the punch station on horizontally translatable struts. When idler rolls 568 and 569 and punch station 503 advance to the dotted line position illustrated in FIG. 20, die plate 505, which is fixedly mounted on station 503, has advanced slightly farther to a position where punching occurs. The punches 511 that are restrained by latched anchor levers 513 abut against and punch through tape 501; those punches 511 which are not restrained continue to be translated toward the left in response to the movement of die plate 505 against tape 501. The motion of the unrestrained punches 511 is limited by the force exerted by springs 521 against anchor levers 513 that are not associated with activated solenoids.

The rotation of motor shaft 542 in the clockwise direction is limited by a gear train including gear 545 that is pinned to shaft 542, whereby the leftward translation of die plate 505 is correspondingly limited. Gear 545 meshes with gear 546 that is pinned to pinion shaft 547. Pinion shaft 547 drives gear 548 which is free to turn on sleeve bearing 549 that is carried by motor shaft 542. Gear 548 carries a longitudinally extending pin 551 on its face. Pin 551 selectively engages opposite edges of limit switch actuator 552 that is formed as a radially extending tongue on sleeve bearing 549. In response to rotation of shaft 542 a predetermined amount, less than several revolutions, in the counterclockwise direction, pin 551 engages the upper edge of tongue 552, causing the tongue to be rotated in the clockwise direction, to engage limit switch 553.

In response to activation of limit switch 553, power is removed from motor 401. Thereby motor 401 is de-energized in response to tongue 552 engaging switch 553. Shortly thereafter, a leading edge of a signal derived for this purpose is applied to the energization circuits for solenoids 531, causing the solenoids to be de-activated. As solenoids 531 are being de-activated, current flows through motor 401 in the opposite direction from that which caused clockwise rotation of shaft 542, whereby shaft 542 is driven in the counterclockwise direction. Counterclockwise rotation of shaft 542 continues until pin 551 engages the lower edge of tongue 552 to drive the tongue in the counterclockwise direction into engagement with limit switch contacts 553 which correspond with contacts 423, FIG. 12. In response to contacts 553 being engaged, contacts 423 are open-circuited to de-energize motor 401 and prevent further rotation of shaft 542 in the counterclockwise direction.

Activation of motor 401 causes advancement of paper tape 501 so that the paper tape advances through the gap between die plate 505 and punching station 503 at the same rate as the leftward movement of the die plate and punching station. Since tape 501 and die plate 505 are advancing at the same rate, the tape is stationary with respect to the die plate during the punching part of the cycle. Advancement of paper tape 501 is provided by coupling the tape drive mechanism 507 to motor 401.

Tape drive mechanism 507 includes an idler bracket 561, the lower end which is fixedly connected to push plate 543 by push rod 562. The upper end of idler bracket 561 is mounted to pivot about pin 563 so that when motor 401 drives push plate 543 to the left, the idler bracket is rotated in a clockwise direction. Clockwise rotation of idler bracket 561 results in paper tape 501 advancing to the left on the lower side of the recorder at the same rate that die head 505 is moving to the left. To this end, idler bracket 561 carries roller 564, over which tape 501 is wound for approximately 180°. Roller 564 is mounted on idler bracket 561 by shaft 565 that is positioned between the upper and lower ends of the idler bracket. Tape 501 is restrained from moving on the upper side of the recorder by ratcheted drive sprocket 566, having teeth which engage the sprocket holes of tape 501, and which is positioned on the upstream side of the gap between punches 511 and plate 505, between idler roll 564 and the gap.

Tape 501 is wound so that it extends from the upper portion of idler roller 564 over sprocket 566 and thence to fixedly mounted idler roller 567. From the upper end of idler roller 567, tape 501 extends to idler roller 568, over which it passes for approximately 90° into the gap between punch station 503 and die head 505. Downstream of punch station 503, tape 501 makes a 90° turn at idler roller 570 and ratcheted drive sprocket 571. From sprocket 571, the tape proceeds to idler 572 and back to the underneath surface of idler 564.

In response to motor 401 rotating in the counterclockwise direction, to translate die plate 505 toward the right, idler bracket 561 is rotated counterclockwise about pin 563. Counterclockwise rotation of idler bracket 561 results in tape 501 being drawn from the upper side of the recorder since the tape is now restrained by ratcheted drive sprocket 571. Thereby, paper tape 501 is advanced through the punch station 503 into the next punch position. Ratcheted drive sprockets 566 and 571 are adjusted such that the motion of push plate 543 causes paper tape 501 to advance exactly 0.100 inch, the standard advancement of a punch paper tape for each punching operation. Thereby, conventional punch paper tape readout mechanism can be utilized to interpret the stored data indicative of the readings of LVDT 21.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A punch paper tape recorder comprising a plurality of punches, a die plate, a gap through which the tape passes being formed between the punches and die plate, means for selectively urging said die plate toward the paper tape and the punches, and means for selectively restraining movement of certain of said punches relative to the movement of the paper tape and the die plate while enabling others of said punches to be moved in response to the movement of the die plate, said punches and die plate being activated so that the restrained punches cause holes to be punched into the paper tape in response to movement of the die plate, and wherein said means for restraining movement of selected punches includes for each punch a rotatable anchor lever having a face bearing against a face of the punch remote from the gap, a latch lever for the anchor lever, said latch lever having a notch against which a corner of the anchor lever is positioned, and means for selectively urging the latch lever to be rotated about a pivot point thereof so that the notch thereof captures the corner of the anchor lever to restrain rotation of the anchor lever and movement of the punch.

2. A punch paper tape recorder comprising a plurality of punches, a die plate, a gap through which the tape passes being formed between the punches and die plate, means for selectively urging said die plate toward the paper tape and the punches, means for advancing the tape through the gap at the same rate as the die plate approaches the tape and while the die plate is approaching the tape, said means for advancing the tape including means for enabling the tape downstream of the gap to be advanced while the tape upstream of the gap is being retained during movement of the die plate toward the punches and for restraining movement of the tape downstream of the gap while enabling movement of the tape upstream of the gap as the die plate is moving away from the punches after a punching operation has occurred, and means for selectively restraining movement of certain of said punches relative to the movement of the paper tape and the die plate while enabling others of said punches to be moved in response to the movement of the die plate, and punches and die plate being activated so that the restrained punches cause holes to be punched into the paper tape in response to the movement of the die plate.

3. The recorder of claim 2 wherein the means for advancing the tape includes an idler roll mounted on a rotatable bracket connected for rotation away from and toward the gap as the die plate is being advanced toward and restracted from the punches, first ratcheted sprocket means positioned on the downstream side of the tape between the idler roll and the slot, and second ratcheted sprocket means positioned on the upstream side of the tape between the idler roll and the slot, said first and second ratcheted sprocket means respectively being arranged to inhibit movement of the tape as the die plate is moving toward and moving away from the punches.

4. The recorder of claim 3 wherein the means for restraining movement of selected punches includes for each punch a rotatable anchor lever having a face bearing against a face of the punch remote from the gap, a latch lever for the anchor lever, said latch lever having a notch against which a corner o the anchor lever is positioned, and means for selectively urging the latch lever to be rotated about a pivot point thereof so that the notch thereof captures the corner of the anchor lever to restrain rotation of the anchor lever and movement of the punch.

* * * * *